(12) United States Patent
Caucheteux et al.

(10) Patent No.: US 8,128,352 B2
(45) Date of Patent: Mar. 6, 2012

(54) THERMOMECHANICAL PART CONSTITUTING A BODY OF REVOLUTION ABOUT A LONGITUDINAL AXIS AND INCLUDING AT LEAST ONE ABRADABLE RING FOR A SEALING LABYRINTH

(75) Inventors: Mathieu Caucheteux, Creteil (FR); Francois Maurice Garcin, Paris (FR); Jean-Pierre Francois Lombard, Pamfou (FR); Nicolas Christian Triconnet, Saint Fargeau Ponthierry (FR)

(73) Assignee: SNECMA, Paris (FR)

( * ) Notice: Subject to any disclaimer, the term of this patent is extended or adjusted under 35 U.S.C. 154(b) by 443 days.

(21) Appl. No.: 12/428,858

(22) Filed: Apr. 23, 2009

(65) Prior Publication Data

US 2011/0091310 A1    Apr. 21, 2011

(30) Foreign Application Priority Data

Apr. 23, 2008   (FR) ...................... 08 52718

(51) Int. Cl.
*F01D 5/20* (2006.01)
*F01D 11/08* (2006.01)
*F04D 29/08* (2006.01)
*F04D 29/18* (2006.01)

(52) U.S. Cl. ............... 415/173.4; 415/170.1; 415/174.4; 60/223; 60/229; 60/237; 60/244

(58) Field of Classification Search ................ 415/134, 415/137, 170.1, 173.4, 174.4, 173.1, 200; 60/223, 224, 229, 237
See application file for complete search history.

(56) References Cited

U.S. PATENT DOCUMENTS 4,531,362 A    7/1985   Barry et al.
(Continued)

FOREIGN PATENT DOCUMENTS

EP    1 172 524 A2    1/2002
EP    1 840 339 A1    10/2007

*Primary Examiner* — David Nhu
(74) *Attorney, Agent, or Firm* — Oblon, Spivak, McClelland, Maier & Neustadt, L.L.P.

(57) ABSTRACT

The invention relates to a turbomachine thermomechanical part forming a body of revolution about a longitudinal axis, and including at least one abradable ring for a labyrinth seal. In characteristic manner, the abradable ring is made up of angular sectors that present different stiffnesses between adjacent pairs of sectors. The invention is applicable to a compressor, a turbine, or to a rotor and stator assembly.

15 Claims, 3 Drawing Sheets

U.S. PATENT DOCUMENTS

| | | | |
|---|---|---|---|
| 5,169,287 A * | 12/1992 | Proctor et al. | 415/115 |
| 5,205,115 A * | 4/1993 | Plemmons et al. | 60/806 |
| 5,219,268 A * | 6/1993 | Johnson | 415/115 |
| 5,439,348 A | 8/1995 | Hughes et al. | |

* cited by examiner

THERMOMECHANICAL PART CONSTITUTING A BODY OF REVOLUTION ABOUT A LONGITUDINAL AXIS AND INCLUDING AT LEAST ONE ABRADABLE RING FOR A SEALING LABYRINTH

CROSS-REFERENCE TO RELATED APPLICATIONS

This application claims the benefit of priority under 35 U.S.C. §119 from French Application 08/52718 filed Apr. 23, 2008.

FIELD OF THE INVENTION

The invention relates to a thermomechanical part constituting a body of revolution about a longitudinal axis, and including at least one abradable ring for a sealing labyrinth. The present invention relates to a thermomechanical part for a turbomachine, and in particular for an airplane engine.

BACKGROUND OF THE INVENTION

A sealing labyrinth, also known as a labyrinth seal, comprises a rotary portion having fins (or wipers) together with a stationary bore covered in a lining of abradable material, or in a honeycomb structure capable of withstanding high temperatures.

When the engine starts, the fins of the seal rub lightly against the lining, biting into it, and thus leading to minimum spacing. This clearance varies during different cycles depending on the expansion of the parts and on the natural flexibility of the moving portions.

The labyrinth wipers serve to provide aerodynamic sealing between enclosures containing air at different pressures. In general, they are situated on the rotor portion facing stator portions covered in the lining of abradable material. They are constituted mainly by "blades" of annular shape, that are continuous or segmented in the circumferential direction, being directed radially either inwards or outwards.

In particular, when they are of continuous form, the wipers are liable to come into contact with the stator under certain operating configurations. In order to avoid them being destroyed in such situations, stators are fitted with coverings that provide the interface and that are known as being "abradable". Under such circumstances, the usual sequences of wiper penetration into the abradable lining consists in making a radial cut associated with axial movement (turning-type machining).

Above, it is assumed, that the labyrinth seal wipers are formed on the rotary portion or rotor, however there exist situations in which the labyrinth seal wipers are formed on the stationary portion or stator, with the facing abradable ring then being located on the rotor.

During these contacts between wipers and the facing abradable ring, there exist certain configurations that make the system constituted by the rotor and the stator unstable from a vibratory point of view.

FIG. 1 shows an embodiment in which an abradable ring is used in a labyrinth seal, being placed facing wipers. This embodiment concerns a circuit for ventilating a high-pressure turbine located downstream from a combustion chamber 106.

In particular, there can be seen a turbine 108 with its rotor wheel that is rotatable about an axis X-X'.

The rotor of the turbine 108 comprises a turbine disk 40 fitted with blades 42 and a web 44 located upstream from the disk 40. The disk 40 and the web 44 have respective upstream flanges 40a for the disk 40 and 44a for the web 44, enabling them to be fastened to the downstream end 46 of the downstream 48 of the high-pressure compressor driven by the rotor of the turbine 108.

This arrangement of the cooling circuit has three successive bleed labyrinths.

A first bleed labyrinth 60 is formed upstream from the enclosure 52 separating the web 44 from the chamber end wall and downstream from the enclosure 54 separating the downstream cone 48 of the high-pressure compressor from the inner casing 50 of the combustion chamber 106. This first bleed labyrinth 60 comprises wipers 47 formed on the downstream cone 48 and a ring 58 of abradable material mounted at the end of a web 56 that is secured to the inner casing 50.

A second bleed labyrinth 62 is situated under the injectors 64, downstream from the enclosure 52. This second bleed labyrinth 62 is made of wipers 44b of the web 44 and a ring of abradable material 64a mounted on the injectors 64.

The third bleed labyrinth 66 is situated above the injectors 64, and comprises three successive wipers 44c formed on an angled portion 44d of the web 44 together with an abradable sealing ring 68a mounted on the inner casing 68.

Below, in order to explain the present invention, reference is made solely to the first bleed labyrinth 60, however the explanations given can be applied in like manner to the second bleed labyrinth 62 and/or to the third bleed labyrinth 66.

When contact is made between the abradable ring 58 and the wipers 47, it can be understood that the downstream cone 48 may be subjected to high levels of stress of a vibratory kind, and that this can cause it to vibrate in one or more resonant modes. Under such circumstances, the level of vibration then increases very quickly, subjecting the rotor made up of moving parts connected to the downstream cone 48 to deformation at levels liable to exceed their endurance limits, which also leads to damage to the abradable ring 58 and potentially to damage to one or more of the parts of the rotor, or even to the rotor breaking.

As a general rule, this phenomenon is very brief, either because an external event puts an end to it (change of speed of rotation of the rotor, thermal transient, . . . ), or else because the resonant frequency of the damaged rotor is different, thereby taking the rotor and stator system out of tune.

In general, in order to limit such damage, a suitable abradable material is selected together with wipers of specific shape or some other number of wipers, or else the stiffness of the stator portion (web 56) that supports the ring 58 of abradable material is modified.

OBJECT AND SUMMARY OF THE INVENTION

An object of the present invention is to provide a solution enabling the drawbacks of the prior art to be overcome, and in particular making it possible to avoid any risk of the rotor and stator assembly vibrating.

To this end, the present invention provides for the abradable ring to be made up of angular sectors presenting different stiffnesses between the adjacent pairs of angular sectors.

In this way, it can be understood that according to the invention, the cyclical symmetry of the abradable ring is broken so that it no longer presents a series of geometrically identical sectors. The abradable ring presents either alternating sectors of different stiffness or an irregular succession of sectors of different stiffnesses.

This solution also presents the additional advantage of reducing any risk of the coupling phenomenon, merely by adapting the stator (or rotor) portion that carries the abradable ring, and without having any effect on nearby parts, such that this solution can be applied to existing equipment.

Preferably, in order to form said anti-instability device, the abradable ring is made up of angular sectors of a first type presenting a first stiffness and angular sectors of a second type presenting a second stiffness different from the first stiffness. The angular sectors of the first type present a first angular dimension and the angular sectors of the second type present a second angular dimension.

For reasons of simplicity in modeling and in construction, it is preferable for the first angular sector dimension and the second angular sector dimension to be identical, so that the elements of the first type and the elements of the second type present the same angular extent.

However, it is also possible to envisage a configuration in which the first angular sector of the invention and the second angular sector of the invention are different.

The present invention also applies to circumstances in which said anti-instability device is made by the fact that the abradable ring includes not only angular sectors of the first type and angular sectors of the second type, but also other angular sectors presenting another stiffness, such that the anti-instability device has more than two different stiffnesses around the circumference of the abradable ring.

Equally, the present invention provides a rotor and stator assembly comprising a thermomechanical part as described above forming a first thermomechanical part of one of the stator and the rotor, and a second thermomechanical part forming a body of revolution that is a part of the other one of the stator and the rotor and including an annular wiper for co-operating with said abradable ring in order to form a labyrinth seal.

The present invention also provides an axial compressor for operating at low pressure, at intermediate pressure, or at high pressure, or indeed a centrifugal compressor, and including in its stator or rotor, a thermomechanical part as described above.

The present invention also concerns a turbine for operating at low pressure, at intermediate pressure or at high pressure, and including in its stator or rotor, a thermomechanical part as described above.

Equally, the present invention also provides a turbomachine, in particular a turbojet, including a thermomechanical part as described above.

Finally, the present invention provides a method of preventing instability appearing during contact in a turbomachine stator and rotor assembly that includes a labyrinth seal formed by an abradable ring located on one of the stator and the rotor, together with an annular wiper located on the other one of the stator and the rotor, wherein the method consists in arranging the abradable ring around its circumference as angular sectors presenting different stiffnesses between adjacent pairs of angular sectors.

When the abradable ring is located on the stator, it is preferable for the numbers of angular sectors having the same stiffness in the abradable ring to be not equal to a multiple of the wave number of the vibratory mode to be inhibited of the rotor.

In this way, it is possible to create azimuthal asymmetry in the stiffness of the stator at the location of the abradable ring, which asymmetry is selected to inhibit the desired vibratory mode of the rotor, for the purpose of preventing any phenomenon of coupling between the rotor and the stator.

When the abradable ring is placed on the rotor, it is preferable to select the numbers of angular sectors having the same stiffness in the abradable ring to be not equal to a multiple of the wave number of the vibratory mode to be inhibited of the part, which is then generally the stator carrying the wipers.

BRIEF DESCRIPTION OF THE DRAWINGS

Other advantages and characteristics of the invention appear on reading the following description made by way of example and with reference to the accompanying drawings, in which.

MORE DETAILED DESCRIPTION

Below, when applied to a circular system with cyclical symmetry, the terms "wave number" or "node diameter" or "phase shift index of a vibratory mode" designate the number of peaks or of troughs representing respectively positive and negative amplitude maxima in a radial direction of the wave in question. The number of nodes, i.e. the number of positions where the amplitude of the wave is zero, is twice the wave number.

By way of example, a wave having a wave number of three, corresponding to three node diameters, is a six-node wave.

Figure 3:
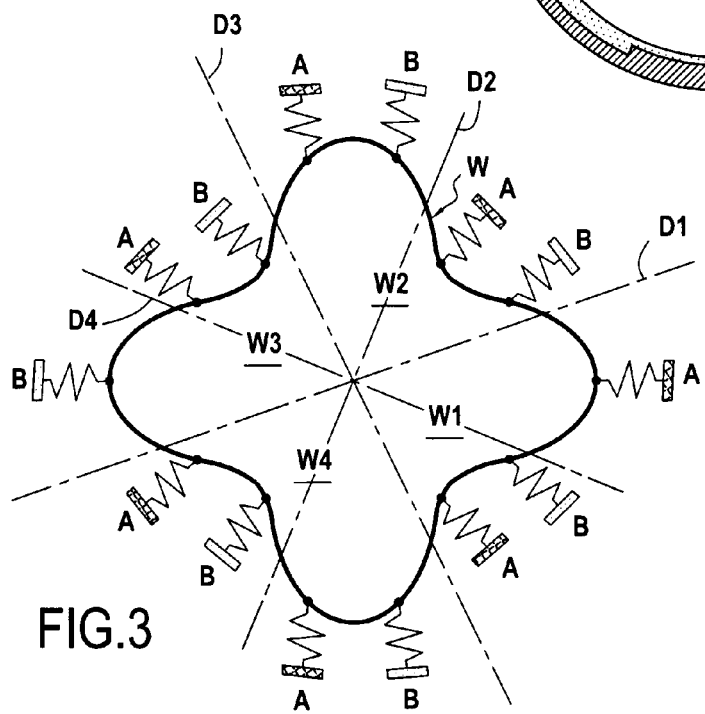
FIG. 3 is an azimuth representation of a wave having a wave number equal to four, showing the correspondence with the dispositions of materials in the abradable layer of FIG. 2.

Thus, in FIG. 3, a wave W is shown in a cylindrical frame of reference (azimuth representation) and it presents four node diameters D1 to D4 that are shown in association with eight vibration nodes situated between the four troughs and four peaks of the wave W. Thus, the wave W presents a wave number equal to four. The wave W is made up of four successive identical sinusoidal profiles: in FIG. 3, the four spatial periods W1 to W4 are defined by the diameters D1 and D3.

In order to illustrate the various embodiments of the present invention, a casing 50 has been selected that is fitted with an abradable ring 58 of the invention and that is provided with an anti-instability device embodied by the abradable ring 58 being made up of fourteen angular sectors of two types presenting two different stiffnesses and corresponding to a succession of fourteen elements of the same angular size, with the elements of any adjacent pair of elements being of different stiffnesses.

Thus, in accordance with the invention, seven (the number of elements of angular sectors having the same stiffness in the anti-instability device) is not a multiple of four (the wave number W).

More precisely, for each of the two embodiments shown and described below, only two types of angular sector are provided, each type having a different stiffness.

Figure 2:
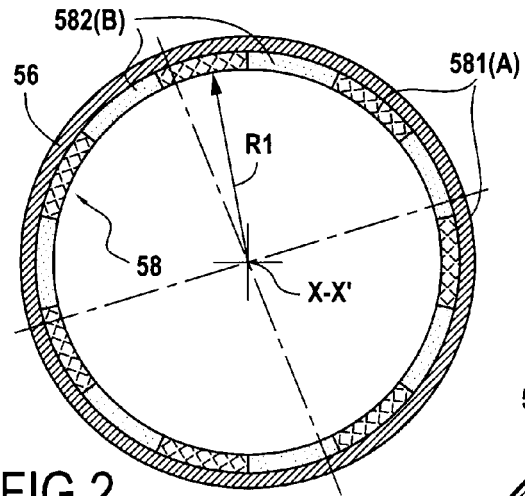
FIG. 2 is a section view seen looking along direction II-II in FIG. 1, showing the abradable layer in a first embodiment of the invention.

In a first embodiment shown in FIG. 2, the invention consists in making an anti-instability device on the inside face of the annular free end of the web 56 by having adjacent angular sectors in the abradable ring 58 made up of abradable materials A and B of different Young's moduluses.

More precisely, the abradable ring 58 comprises in alternation angular sectors of a first type 581 constituted by layers of abradable material A and angular sectors of the second type 582 constituted by layers of abradable material B having a different Young's modulus.

For reasons of simplicity, the angular sectors of the first type 581 and the angular sectors of the second type 582 are selected to present the same thickness and to cover the entire inside face of the annular free end of the web 56, i.e. its entire circumference.

In practice, in order to form this sectorized abradable layer 58 made up of fourteen sectors, comprising seven angular sectors of the first type 581 made of a material A and seven angular sectors 582 of the second type made up of a material B, the materials A and B used are similar but the proportions of the material making up their compositions are varied so as to obtain different Young's moduluses, i.e. different stiffnesses.

It is also possible to use two materials A and B of different kinds in order to make the elements of the first type 581 out of a first material A and the elements of the second type 582 out of a second material B.

For example, the first material A may be a material of the Metco (registered trademark) type, i.e. obtained from a very fine powder made up of a polymer (such as polyethylene terephthalate (PET), for example) with grains covered in alumina and silica powder, together with a binder. This type of powder is generally plasma sprayed, the spraying vaporizing the PET, thereby leading to a porous deposit with a certain ability to withstand high temperature.

By way of example, the second material B may be a material of the RTV (registered trademark) type, namely a silicone rubber compound that withstands temperature variations since it is the result of polymerizing the compound under pressure in order to increase its density. Alternatively, the second material B may be a silastic (registered trademark), i.e. a silicone elastomer.

The techniques used for depositing this sectorized abradable layer 120 remain unchanged and they are naturally associated with the particular material(s) used.

For example, it is also possible to use an alloy based on nickel, molybdenum, and chromium, in particular of the Hastelloy (registered trademark) type, which alloy is deposited by plasma spraying, or indeed by laser spraying (the powder is projected into a local melt bath generated by the laser beam).

This ends up by providing a sectorized abradable ring 58 in which the radial distance R1 between the axis X-X' of the turbomachine and the inside face of the sectorized abradable ring 58 is constant and substantially equal to the radius of the rotor wipers 47.

Consideration is given to the circumstances in which the wave W is a wave that corresponds to one of the resonant modes of the rotor, and consequently a wave that it is desired to inhibit.

If, as shown in FIG. 3, the wave W is associated with the stator including the casing 50 and the web 56 carrying the abradable ring 58 as shown in FIG. 2, then each spatial period of the wave is associated with a corresponding angular zone of the abradable ring 58 that is of different stiffness, because the abradable ring 58 is sectorized.

Specifically, the first spatial period W1 of the wave W is associated with the first quarter of the circumference of the abradable ring 58 (to the right in FIG. 3), presenting two angular sectors of the first type 581 (material A) and one angular sector of the second type 582 (material B), that follow each other in the order A B A (going clockwise).

Similarly, the second spatial period W2 of the wave W is associated with the second quarter of the circumference of the abradable ring 58 (to the top in FIG. 3) and presents two angular sectors of the first type 581 (material A) and angular sectors of the second type 582 (material B) that follow one another in the order A B A B.

For the third spatial period W3 of the wave W and the third quarter of the circumference of the abradable ring 58 (to the left in FIG. 3), there is a succession of materials B A B, and for the fourth spatial period of the wave W and the fourth quarter of the circumference of the abradable ring 58 (to the bottom in FIG. 3), there is a succession of materials B A B A.

Thus, from this system, it can be seen that each spatial period W1 to W4 of the wave W is associated with a different stiffness of the corresponding angular portion on the abradable ring 58. As a result, each spatial period W1 to W4 of the wave W propagates at a speed that is different, such that the wave W cannot become installed in the abradable ring 58 during phenomena of contact occurring between the rotor and the stator.

Figure 4:
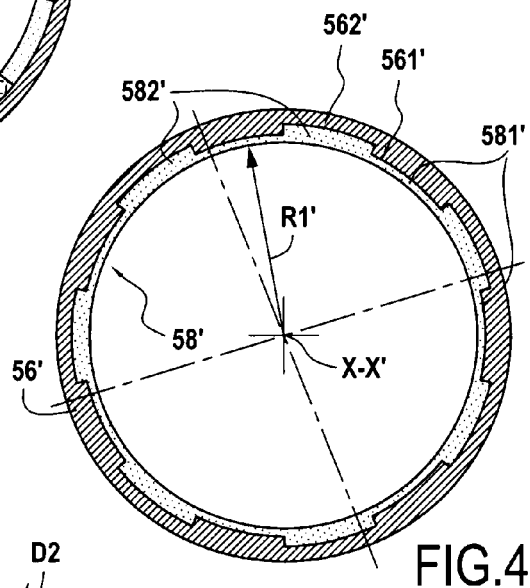
FIG. 4 is a section view seen looking along direction II-II of FIG. 1 showing an abradable layer in a second embodiment of the invention.

In a second embodiment of the invention, as shown in FIG. 4, a sectorized layer of abradable material 58' is used in which two angular sectors 581', 582' of the abradable ring 58' are made of layers of abradable material presenting thicknesses that are different.

Thus, the angular sectors of the first type 581' and the angular sectors of the second type 582' are layers of abradable material presenting different thicknesses, disposed in angular sectors on the inside face of the annular free end of the web 56.

More precisely, angular sectors of the first type 581' and angular sectors of the second type 582' are selected that are made of the same material and that therefore present the same Young's modulus, and that are located over the entire face of the annular free end of the web 56.

To do this, in order to ensure that the radial distance R1' (between the axis X-X' of the turbomachine and the surface of the sectorized abradable ring 58') remains constant, a web 56' is used having an inside face that is crenellated.

More precisely, the inside face of the web 56' has longitudinal grooves 562' that are regularly spaced apart. In this example, the intergroove distance is selected to be equal to the angular sector of each longitudinal groove 562'. Between two adjacent longitudinal grooves 562', there is therefore formed a longitudinal rib 561' presenting the same angular extent.

Thus, in this second embodiment, the inside face of the annular free end of the web 56' is machined so as to form alternating longitudinal ribs 561' and longitudinal grooves 562', and then the abradable layer 58' is deposited.

To do this, it is possible to make a single abradable layer 58' that initially presents a thickness that is constant, and that therefore presents crenellated portions in relief constituting an image of the inside surface of the free annular end of the web 56', which layer is subsequently subjected to surface machining so as to obtain a housing of radius R1' in the annular free end of the web 56'.

Alternatively, it is possible to deposit the material forming the angular sectors of the first type 581' and the angular sectors of the second type 582' separately, respectively on the longitudinal ribs 561' and in the longitudinal grooves 562' of the inside surface of the free annular end of the web 56', with deposition then being performed directly with thickness that differs between the angular sectors of the first type 581' and the angular sectors of the second type 582'. Specifically, the thickness difference between the angular sectors of the first type 581' and the angular sectors of the second type 582' is equal to the depth of the longitudinal groove 562'. More precisely, the angular sectors of the first type 581' covering the longitudinal ribs 561' are not as thick as the angular sectors of the second type 582' covering the longitudinal grooves 562'.

The first and second embodiments of the invention as described above with reference to FIGS. 2 and 3 correspond to the abradable ring 58, 58' being disposed on the inside face of a web 56/56' forming a thermomechanical part forming part of a turbomachine stator.

Under such circumstances, the total number of angular sectors provided (fourteen in these examples) is chosen to be not equal to a multiple of the wave number (four in these examples) of a vibratory mode to be inhibited of the turbine rotor 108.

It can thus be understood, that for the abradable ring of the invention forming a thermomechanical part of the stator, by selecting the number of angular sectors of the first type and of angular sectors of the second type to be not equal to a multiple of the wave number of the vibratory mode to be inhibited of the rotor, any propagation of said vibratory mode to the stator is prevented during phenomena of contact occurring between the rotor and the stator.

These embodiments relate to only one particular wave W (having a wave number equal to four) and one particular number of angular sectors of the first and second type (i.e. seven) for the associated anti-instability device.

In general, it is necessary to adapt the succession of angular sectors of the first type and of angular sectors of the second type, i.e. to adapt their numbers and their individual angular extents, so as to build up an abradable ring presenting a pattern that is adapted to the wave number(s) of the vibratory mode(s) of the rotor that it is desired to disturb.

In the present invention, it should be understood that the abradable material may either be a "solid" material, or else a cellular structure known as a "honeycomb".

Thus, in the first embodiment of FIG. 2, the angular sectors of the first type 581 and the angular sectors of the second type 582 having the same thickness, can be made respectively out of two abradable materials A and B of different Young modu-luses, which materials are honeycomb structures of different overall stiffnesses. For example, the sectors of different stiff-nesses may be obtained by using honeycombs of different geometrical structures or by using materials having different elastic characteristics for making the honeycomb structures.

It is also possible to envisage the abradable material A being a "solid" material while the abradable material B is a honeycomb structure material.

Likewise, the second embodiment of FIG. 4 needs to be understood as being suitable for being obtained by a honey-comb structure of abradable material presenting different thicknesses between adjacent pairs of angular sectors 581' and 582' in the abradable ring 58'.

Figure 1:
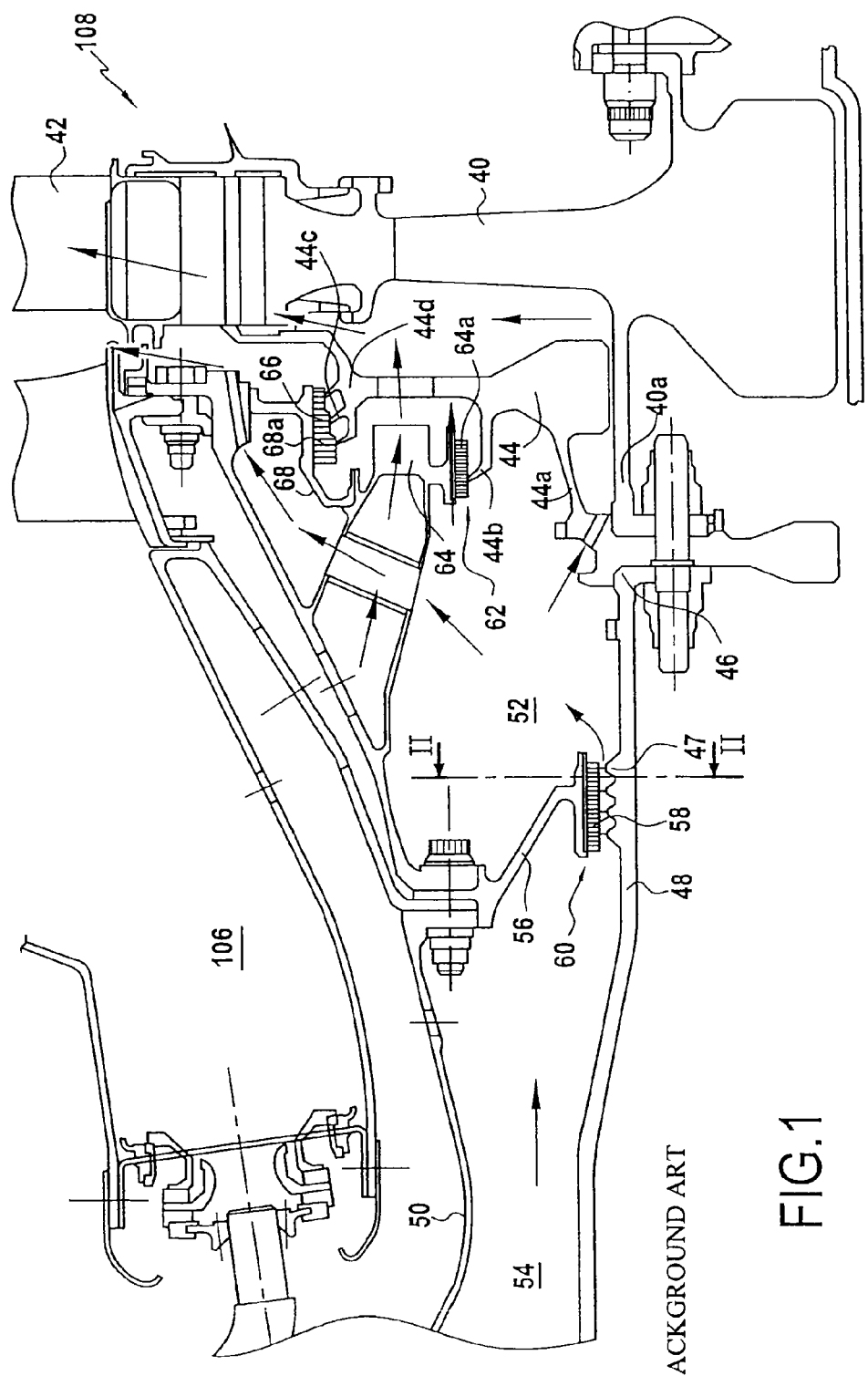
FIG. 1, described above, is an axial half-section view of a turbine rotor in a turbojet and it shows how the web and the sealing labyrinths are disposed upstream from the main injectors.

In FIG. 1, the abradable ring 58 is disposed on a stator and faces radially towards the axis of rotation X-X' of the turbo-machine.

Nevertheless, it will be readily be understood that the present invention can equally well be applied to an abradable ring being disposed on a rotor facing radially away from the axis of rotation X-X'. Under such circumstances, it is prefer-able to select numbers of angular sectors of given stiffness in the abradable ring that are not equal to the wave number of the vibratory mode to be inhibited of the part, which is then generally the stator carrying the wipers.

Figure 5:
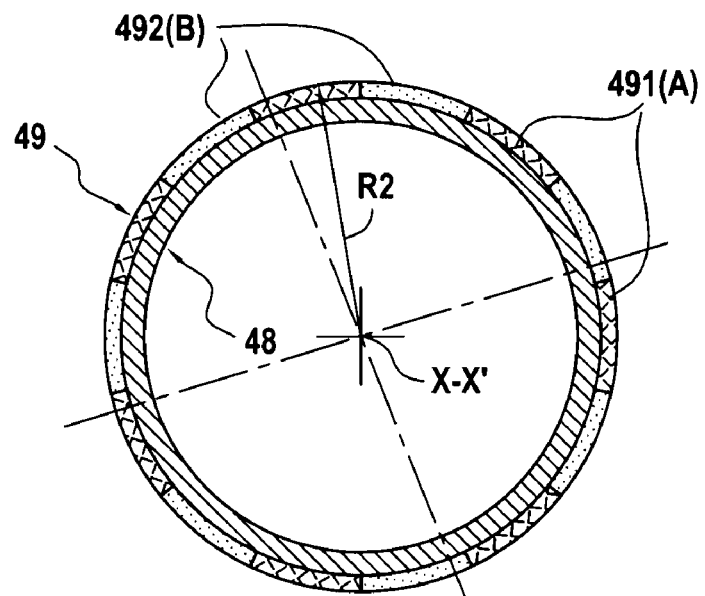
FIGS. 5 and 6 are section views corresponding to FIGS. 3 and 4 when the abradable ring is on the rotor.
Figure 6:
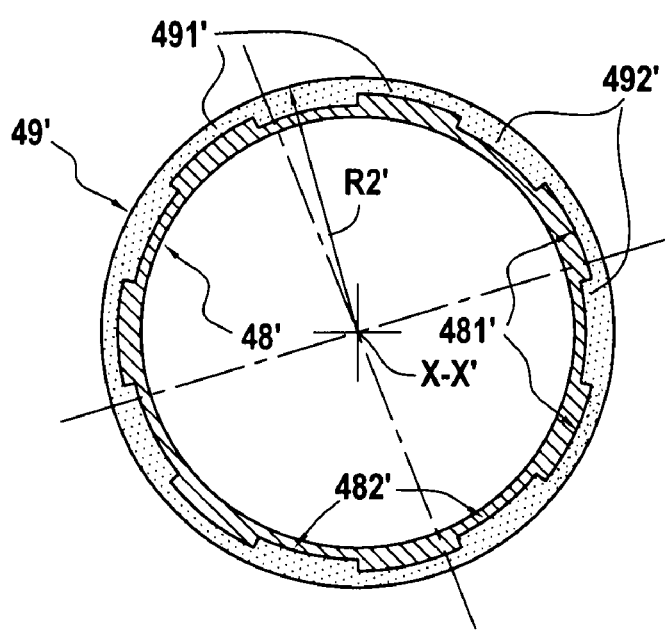

Thus, in an alternative of the first and second embodiments of the invention, as shown in FIGS. 5 and 6, the abradable ring is disposed on an outside face of a thermomechanical part of the turbomachine rotor.

If this alternative is applied to making the first bleed laby-rinth 60 of FIG. 1, then it is the outside face of the downstream cone 48 that is fitted with an anti-instability device in the form of an abradable ring 49 or 49', instead of being fitted with wipers 47, while the abradable ring 58 (or 58') of FIG. 1 is replaced by wipers (not shown).

In FIG. 5, the outside surface of the downstream cone 48 is covered in a sectorized abradable ring 49 made up of fourteen angular sectors having the same angular extent and the same thickness, being distributed as an alternation of seven angular sectors of the first type 491 made of a material A and seven angular sectors 492 of the second type made of a material B. This abradable ring 49 presents an outside face that is spaced apart from the axis X-X' of the turbomachine by the radial distance R2.

In FIG. 6, the outside surface of the downstream cone 48 has an annular track that is crenellated by the track being subdivided into fourteen angular sectors, each presenting the same angular extent, and distributed as an alternation of seven longitudinal ribs 481' and seven longitudinal grooves 482'. The outside face of the abradable ring 49' is situated at a radial distance R2' from the turbomachine axis X-X'.

The abradable ring 49' comprises an alternation of seven angular sectors of the first type 491' and seven angular sectors of the second type 492', the types differing from each other only in their thicknesses, which thicknesses present a differ-ence equal to the depth of the longitudinal grooves 482', the angular sectors of the first type 491' covering the longitudinal ribs 481' being thinner than the angular sectors of the second type 492' covering the longitudinal grooves 482'.

In the figures, the application of the present invention is shown with reference to a downstream portion of a high-pressure axial compressor.

Nevertheless, it should be understood that the present invention can be implemented in other zones of a turboma-chine, in particular in other portions of an axial compressor at intermediate pressure, in an axial compressor at low pressure, in a centrifugal compressor, or indeed in a turbine at high pressure, at low pressure, or at intermediate pressure.

What is claimed is:

1. A turbomachine thermomechanical part forming a body of revolution about a longitudinal axis, comprising:
   a rotor or a stator of a rotor and stator assembly; and
   at least one abradable ring for a labyrinth seal of the rotor and stator assembly,
   wherein the abradable ring is made up of angular sectors that present different stiffnesses between adjacent pairs of angular sectors, and
   wherein the numbers of angular sectors of given stiffness in the abradable ring are not equal to a multiple of the wave number of a vibratory mode to be inhibited of the rotor.

2. The turbomachine thermomechanical part according to claim 1, wherein two adjacent angular sectors of the abrad-able ring are made up of abradable materials having different Young's moduluses.

3. The turbomachine thermomechanical part according to claim 1, wherein two adjacent angular sectors of the abrad-able ring are made of layers of abradable material presenting different thicknesses.

4. The turbomachine thermomechanical part according to claim 1, forming part of a turbomachine rotor, wherein the abradable ring is disposed on an outside face of the turboma-chine thermomechanical part.

5. The turbomachine thermomechanical part according to claim 1, forming part of a turbomachine stator, wherein the abradable ring is disposed on an inside face of the turboma-chine thermomechanical part.

6. The turbomachine thermomechanical part according to claim 1, wherein the abradable ring comprises elements of a first type presenting a first stiffness and first angular sector size, and elements of a second type presenting a second stiffness different from the first stiffness, and a second angular sector dimension that is identical to the first angular sector dimension.

7. The turbomachine thermomechanical part according to claim 1, wherein the abradable ring comprises elements of a first type presenting a first stiffness and a first angular sector dimension, and elements of a second type presenting a second stiffness different from the first stiffness and a second angular sector dimension that is different from the first angular sector dimension.

8. The turbomachine thermomechanical part according to claim 1, wherein the turbomachine thermomechanical part composes at least a portion of a compressor.

9. The turbomachine thermomechanical part according to claim 1, wherein the turbomachine thermomechanical part composes at least a portion of a turbine.

10. The turbomachine thermomechanical part according to claim 1, wherein the turbomachine thermomechanical part composes at least a portion of a turbomachine.

11. A rotor and stator assembly comprising:
a first turbomachine thermomechanical part forming a body of revolution about a longitudinal axis;
at least one abradable ring made up of angular sectors presenting different stiffnesses between adjacent pairs of angular sectors, said first turbomachine thermomechanical part forming a part of one of a stator and a rotor; and
a second turbomachine thermomechanical part forming a body of revolution that is a part of the other one of the stator and the rotor and that includes an annular wiper for co-operating with said abradable ring to form a labyrinth seal.

12. The rotor and stator assembly according to claim 11, wherein two adjacent angular sectors of the abradable ring are made up of abradable materials having different Young's moduluses.

13. The rotor and stator assembly according to claim 11, wherein two adjacent angular sectors of the abradable ring are made of abradable material layers of different thicknesses.

14. A method of preventing instability appearing during contact in a stator and rotor assembly of a turbomachine that includes a labyrinth seal made up of an abradable ring disposed on one of a stator and a rotor, and an annular wiper disposed on the other one of the stator and the rotor, wherein the method consists in:
arranging the abradable ring in the form of angular sectors that present different stiffnesses between adjacent pairs of angular sectors.

15. The method according to claim 14, wherein the abradable ring is disposed on the stator, and wherein the numbers of angular sectors having the same stiffness in the abradable ring are not equal to a multiple of the wave number of the vibratory mode to be inhibited of the rotor.

* * * * *